United States Patent
Sutton (10) Patent No.: US 6,725,551 B1
(45) Date of Patent: Apr. 27, 2004

(54) APPARATUS AND METHOD FOR TRANSFERRING TARGET POINTS FROM ONE SURFACE TO ANOTHER

(76) Inventor: Warren M. Sutton, 1050 E. 24 St., Hialeah, FL (US) 33013

( * ) Notice: Subject to any disclaimer, the term of this patent is extended or adjusted under 35 U.S.C. 154(b) by 0 days.

(21) Appl. No.: 09/993,668

(22) Filed: Nov. 27, 2001

(51) Int. Cl.$^7$ ............................................. G01C 15/00
(52) U.S. Cl. ............................ 33/286; 33/1 G; 33/227; 33/DIG. 21
(58) Field of Search ...................... 33/291, 1 G, 227, 33/228, 263–264, 281–286, 760, 772, 773, 775, 779–782, 276, 278–280, 520, DIG. 21, 644, 670, 673, 675

(56) References Cited

U.S. PATENT DOCUMENTS

| | | | | |
|---|---|---|---|---|
| 15,040 A | * | 6/1856 | Hervey | 33/279 |
| 1,048,570 A | * | 12/1912 | Murphy | 33/280 |
| 3,471,234 A | * | 10/1969 | Studebaker | 356/3 |
| 3,737,232 A | * | 6/1973 | Milburn, Jr. | 33/276 |
| 3,776,496 A | * | 12/1973 | Reed | 248/182.1 |
| 3,911,588 A | | 10/1975 | Ohneda | 33/286 |
| 3,988,837 A | * | 11/1976 | Benson | 33/227 |
| 4,137,638 A | * | 2/1979 | Watts | 33/503 |
| 4,471,530 A | | 9/1984 | Kirven | 33/286 |
| 4,703,563 A | | 11/1987 | Hoshino et al. | 33/227 |
| 4,750,271 A | * | 6/1988 | Ericksen | 33/613 |
| 5,012,585 A | | 5/1991 | DiMaggio | 33/286 |
| 5,107,598 A | * | 4/1992 | Woznow et al. | 33/521 |
| 5,320,111 A | | 6/1994 | Livingston | 128/754 |
| 5,644,850 A | | 7/1997 | Costales | 33/282 |
| 5,782,003 A | * | 7/1998 | Bozzo | 33/285 |
| 5,784,793 A | * | 7/1998 | Rando | 33/227 |
| 5,819,424 A | * | 10/1998 | Ohtomo et al. | 33/227 |
| 5,859,783 A | * | 1/1999 | Ytterberg et al. | 33/1 BB |
| 5,872,657 A | * | 2/1999 | Rando | 33/286 |
| 5,912,733 A | * | 6/1999 | Dunlop et al. | 356/250 |
| RE36,257 E | * | 7/1999 | Thomson | 33/1 G |
| 5,983,510 A | * | 11/1999 | Wu et al. | 33/227 |
| 6,073,353 A | | 6/2000 | Ohtomo et al. | 33/290 |
| 6,145,207 A | * | 11/2000 | Brunson | 33/199 B |
| 6,202,313 B1 | | 3/2001 | Yamashita | 33/286 |
| 6,247,238 B1 | | 6/2001 | Harvey et al. | 33/286 |

\* cited by examiner

*Primary Examiner*—Christopher W. Fulton
*Assistant Examiner*—Amy R. Cohen
(74) *Attorney, Agent, or Firm*—Jacobson Holman PLLC (57) ABSTRACT

A mobile apparatus and method to accurately transfer one or multiple points on one surface to one or multiple points on another surface, such as a reference line or markings on a floor to target points on an overhead ceiling for hanging support brackets. The apparatus includes a base supported by four wheels and a leveled top plate to facilitate use on uneven surfaces. Laser brackets mounted on said top plate support fixed lasers for single point layout. Laser brackets mounted on the ends of transversely movable support arms support movable lasers from said top plate for dual point layout. Vertical pointers on said base position the base on the floor markings. A linear measurement device accurately measures linear movement of the apparatus along the floor surface. A drum attachment supports a laser to provide indicator lines along radiuses in a horizontal and vertical plane.

12 Claims, 7 Drawing Sheets

APPARATUS AND METHOD FOR TRANSFERRING TARGET POINTS FROM ONE SURFACE TO ANOTHER

BACKGROUND OF THE INVENTION

1. Field of the Invention

The present invention generally relates to an apparatus to facilitate accurate transfer of one or multiple points on one surface to one or multiple points on another surface, and a method therefor. The apparatus is in the form of a mobile structure including a base supported by four wheels and a movable top member or plate which can be leveled to facilitate use on uneven surfaces. Multiple lasers mounted on the mobile structure are used to transfer multiple points from the floor to an overhead surface, such as a ceiling of a room, hallway or the like, as well as from wall to wall.

More particularly, the mobile apparatus and method of the present invention are especially useful in marking the points on an overhead surface, such as ceilings of a building relative to a reference line on the floor surface. The apparatus serves to locate target points where support brackets or hangers are to be placed for the hanging of ductwork of an overhead air handling duct system or cable trays, piping or other conduit systems to be hung from a ceiling by tracking a reference line or markings on the floor. A linear measuring device indicates linear spacing for the support brackets on the ceiling to position the bracket attachments points in accurate lateral and linear relationship to the ductwork or other system to be installed.

2. Description of the Prior Art

One of the difficult problems in building construction and renovation is the proper placement of the support brackets or hangers from the ceiling which are used to support HVAC ductwork, cable trays, water piping, or other overhead conduit systems. Often this placement is a "hit or miss" operation, using plumb lines, measuring tapes and the like to best estimate the target points by reference to a centerline of the applicable duct, cable, piping or other system on the floor surface. The task is even more difficult for the installing contractor if the ceiling surface is uneven or certain components have been already installed, e.g. the HVAC ductwork is already installed when trying to target hanger attachment points for cable trays, piping and the like. There is presently no available apparatus which can accurately mark the desired target points on the ceiling from a centerline of the proposed system on the floor surface.

Further, a laser or lasers have been utilized to determine or indicate the relationship between various points or reference lines in space including determining the relationship between vertically spaced reference points on one surface to a target point or points on another surface or surfaces. However, the prior art does not disclose a mobile or wheeled structure supporting multiple lasers which simultaneously emit beams in multiple directions to transfer multiple points from one surface to another surface or surfaces, such as from the floor to the ceiling as well as wall to wall. Also, the prior art does not disclose a mobile apparatus and method to indicate the location of hanger brackets on the ceiling to support ducts in an air duct system by utilizing a reference duct system center line on the floor surface of a building. The prior art also fails to disclose a mobile apparatus having pointers thereon relating to a reference center line on a floor surface underlying the apparatus with a tracking system indicating spatial relationship from point to point along the reference center line. The prior art also fails to disclose an attachment to support a laser for rotation about a vertical axis to assist with curved installations.

SUMMARY OF THE INVENTION

The present invention includes a mobile apparatus having a base supported by wheels to enable it to be moved along a supporting surface, such as a floor surface of a building floor being, built out or under renovation. The base includes a movable top member or plate which can be leveled and provides support for two fixed laser brackets to accommodate single point layout as well as two laser brackets affixed at the ends of transversely movable support arms to facilitate dual point layout. A drum with a 360° protractor on its upper end has a rotatable laser bracket to enable movement of a laser beam in a horizontal plane about a generally vertical axis. The lasers for the present invention are preferably conventional self-leveling lasers which emit a beam in five directions, three in the horizontal plane and two in the vertical plane.

The base of the mobile apparatus also includes a vertical pointer extending downwardly from the center of the front and rear of the base in order to center the cart directly over a chalk line, or other reference line or markings, on the floor surface in order to properly orient the apparatus in relation to the chalk or reference line or markings. In addition, the mobile apparatus includes a fifth laser which provides a laser beam that can be moved about a radius having a center coinciding with the center of a protractor on the upper surface of a cylindrical drum mounted on the leveled movable top member or plate. A tracking system in the form of a resettable linear measurement device accurately measures linear spacing from point to point on the reference line or surface markings in order to properly indicate linear spacing of points on the overhead surface. The apparatus also preferably includes a handle for easy manipulation.

The method of the present invention contemplates tracking a reference line or markings on the floor surface of a building floor being built out or under renovation with a mobile apparatus. At appropriate intervals, vertical laser beams from conventional lasers properly positioned on the mobile apparatus identify target locations on the overhead ceiling or surface of the subject building floor where support brackets or hangers should be attached for supporting HVAC ductwork, cable trays, piping and other overhead conduit systems. The appropriate intervals are determined by a resettable linear measurement device mounted on the mobile apparatus to accurately measure linear spacing from point to point on the reference line or markings in order to properly indicate linear spacing of points on the overhead ceiling or surface. A laser also provided on the mobile apparatus can track selected locations on wall surfaces to further identify target locations on the overhead ceiling.

In accordance with the foregoing, it is an object of the present invention to provide an apparatus and method to facilitate the transfer of one or multiple points on one surface of a structure to a single or multiple points on another surface with a high degree of, accuracy and which can be easily and quickly adjusted to accurately transfer such point or points.

A further object of the present invention is to provide an apparatus and method which can accurately pinpoint target points on an overhead surface for attaching support brackets or hangers for HVAC ductwork, cable trays, piping and other overhead conduit systems based upon a chalk or reference line or markings laid out on a floor surface.

Another object of the present invention is to provide an apparatus having a wheeled base in the form of a frame supported adjacent its forward and rear edges by support wheels at each side and a handle structure upstanding from the rear to facilitate manipulation in the form of a pushcart, with the base supporting a top member or plate vertically above the base and which can be leveled in relation to the base to facilitate use of the apparatus on uneven surfaces.

Still a further object of the present invention is to provide a mobile apparatus in accordance with the preceding objects in which the top member includes two fixed spaced laser brackets to accommodate single point layout and a pair of adjustable support arms with laser brackets thereon to facilitate dual point layout.

Still another object of the present invention is to provide a mobile apparatus in accordance with the preceding objects which includes a linear measurement device having an indicator adjacent the handle structure for observation by an operator using the apparatus to enable accurate measurement of the linear distance moved by the apparatus and accurate spacing of linear spaced points without the points being marked along a reference line with which front and rear pointers on the cart are associated.

Yet a further object of the present invention is to provide an apparatus in accordance with the preceding objects in which the top member or plate of the apparatus is provided with a detachably mounted drum having a 360° protractor on an upwardly facing surface. A pivot arm mounted on the drum supports a laser for rotation in a horizontal plane about the pivot point of the pivot arm. The laser can also rotate in a vertical plane. The pivot arm can be locked in a desired position which can be determined by pointers associated with the 360° protractor to enable a laser beam to indicate arcuate or curved lines on a surface. The drum also includes peripheral openings to enable the laser beam from another laser supported on the top member to shine through the openings in the drum to indicate a point forwardly of the apparatus.

Yet another object of this invention is to provide a mobile apparatus in accordance with the preceding objects which will conform to conventional forms of manufacture, be of simple construction and easy to use so as to provide an apparatus that will be economically feasible, long lasting and relatively trouble free in operation.

Still yet another object of the present invention to be specifically enumerated herein is to provide a mobile apparatus and method in accordance with the preceding objects which can track a reference line or markings on the floor surface of a building floor and can identify target locations on the overhead ceiling by vertical laser beams from lasers properly positioned on the mobile apparatus.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Although only one embodiment of the invention is explained in detail, it is to be understood that the embodiment is given by way of illustration only. It is not intended that the invention be limited in its scope to the details of construction and arrangement of components set forth in the following description or illustrated in the drawings. Also, in describing the preferred embodiment, specific terminology will be resorted to for the sake of clarity. However, the invention is not intended to be limited to the specific embodiment illustrated and terms so selected; it being understood that each specific term includes all technical equivalents which operate in a similar manner to accomplish a similar purpose.

Referring to FIGS. 1–5 of the drawings, the apparatus of the present invention is generally designated by reference numeral 10. The apparatus 10 includes a supporting base, generally designated by reference numeral 12, in the form of a generally rectangular frame 14 including parallel side members 16 and parallel front and rear members 18 and 20 forming a rigid support frame. Preferably two intermediate transverse members extend between side members 16 near the center of the frame 14 for the purpose described hereinafter.

Figure 1:
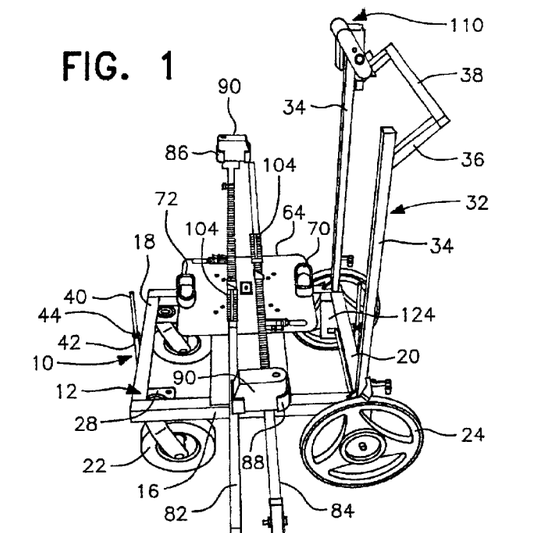
FIG. 1 is a perspective view of a mobile apparatus in accordance with the present invention and illustrating the structural configuration thereof.
Figure 2:
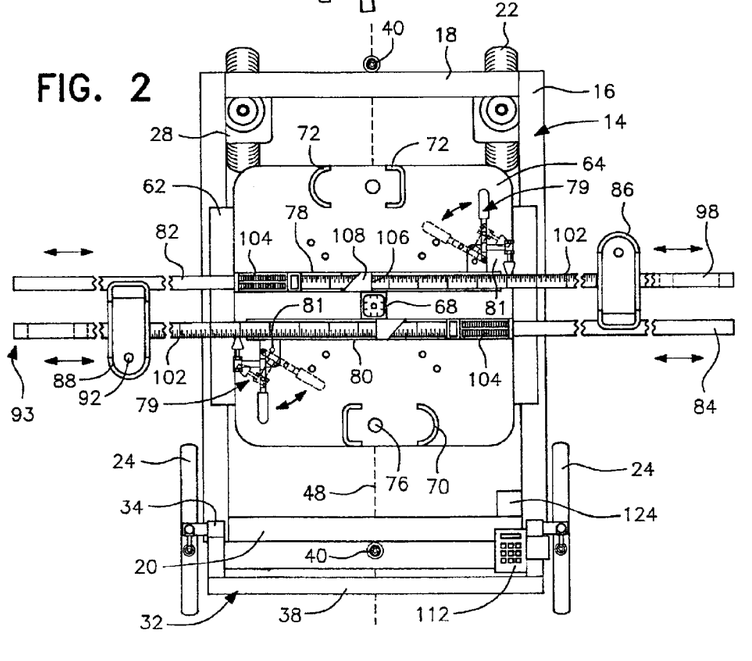
FIG. 2 is a top plan view, on an enlarged scale, of the mobile apparatus shown in FIG. 1 and illustrating a center line of an overhead duct system inscribed on a floor surface.
Figure 3:
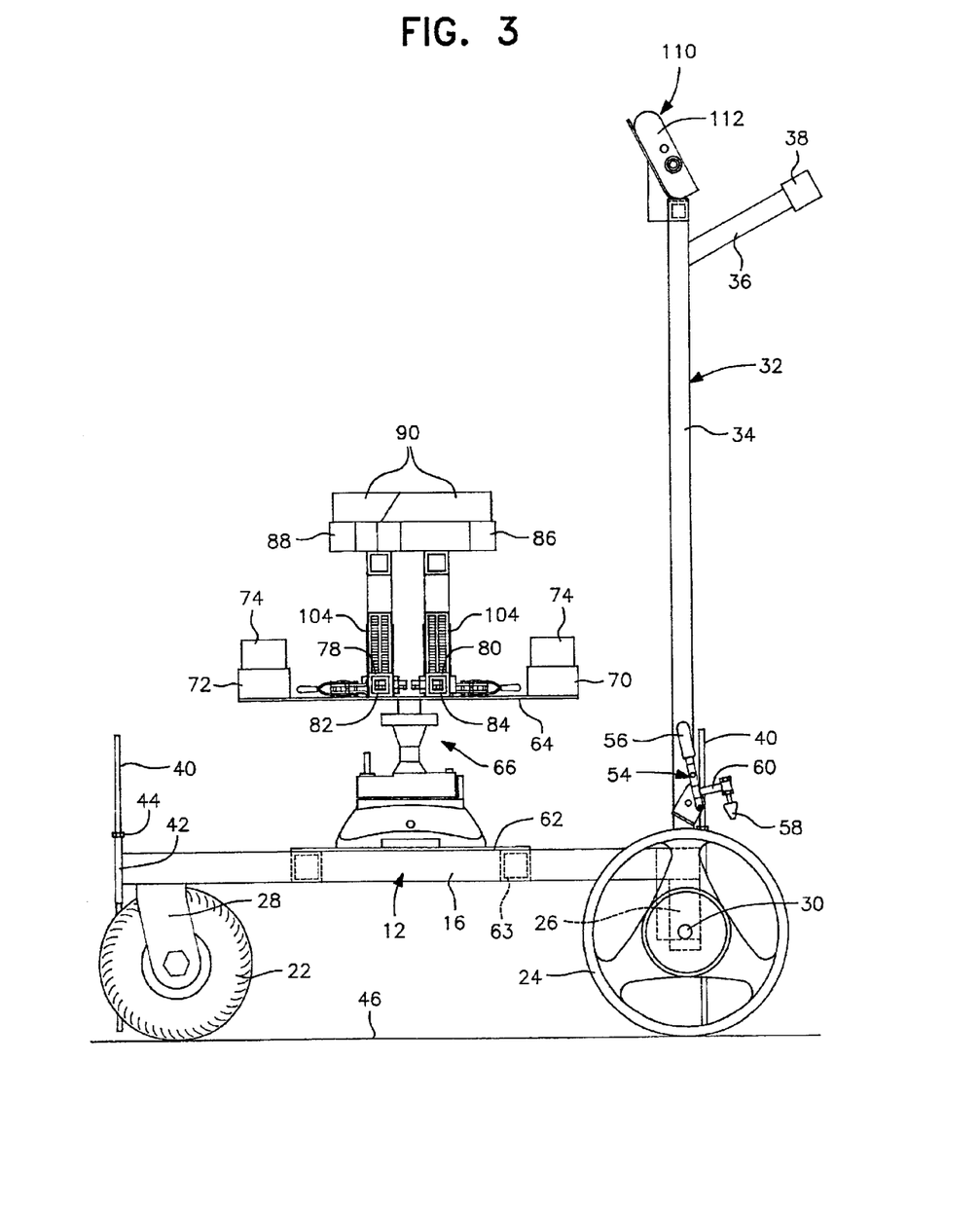
FIG. 3 is a side elevational view, on an enlarged scale of the mobile apparatus shown in FIG. 1.

The front of the frame 14 includes a pair of laterally spaced support wheels in the form of caster wheels 22. The rear portion of the frame 14 is supported by a pair of laterally spaced rear wheels 24 supported by depending brackets 26 affixed rigidly to the rear portion of the frame 14. As illustrated in FIGS. 1–3, the caster wheels 22 are supported for rotational movement and pivotal movement about a vertical axis by supporting bracket structure 28 with the caster wheels 22 being located inwardly of the side edges of the frame 14, while the rear wheels 24 are located outwardly of the rear portion of the frame 14. The depending support structure 26 for the rear wheels 24 supports a transversely extending axle 30 which rotatably supports the wheels 24 from the frame 14.

An upstanding handle structure, generally designated by reference numeral 32, is attached to the frame 14 at its rearward end and includes a pair of laterally spaced upstanding vertical members 34 having rearwardly angled members 36 adjacent their upper ends. The ends of the rearwardly upwardly angled members 36 are interconnected by a rigid transverse bar 38 to form a handle for manipulating the apparatus 10.

Figure 5:
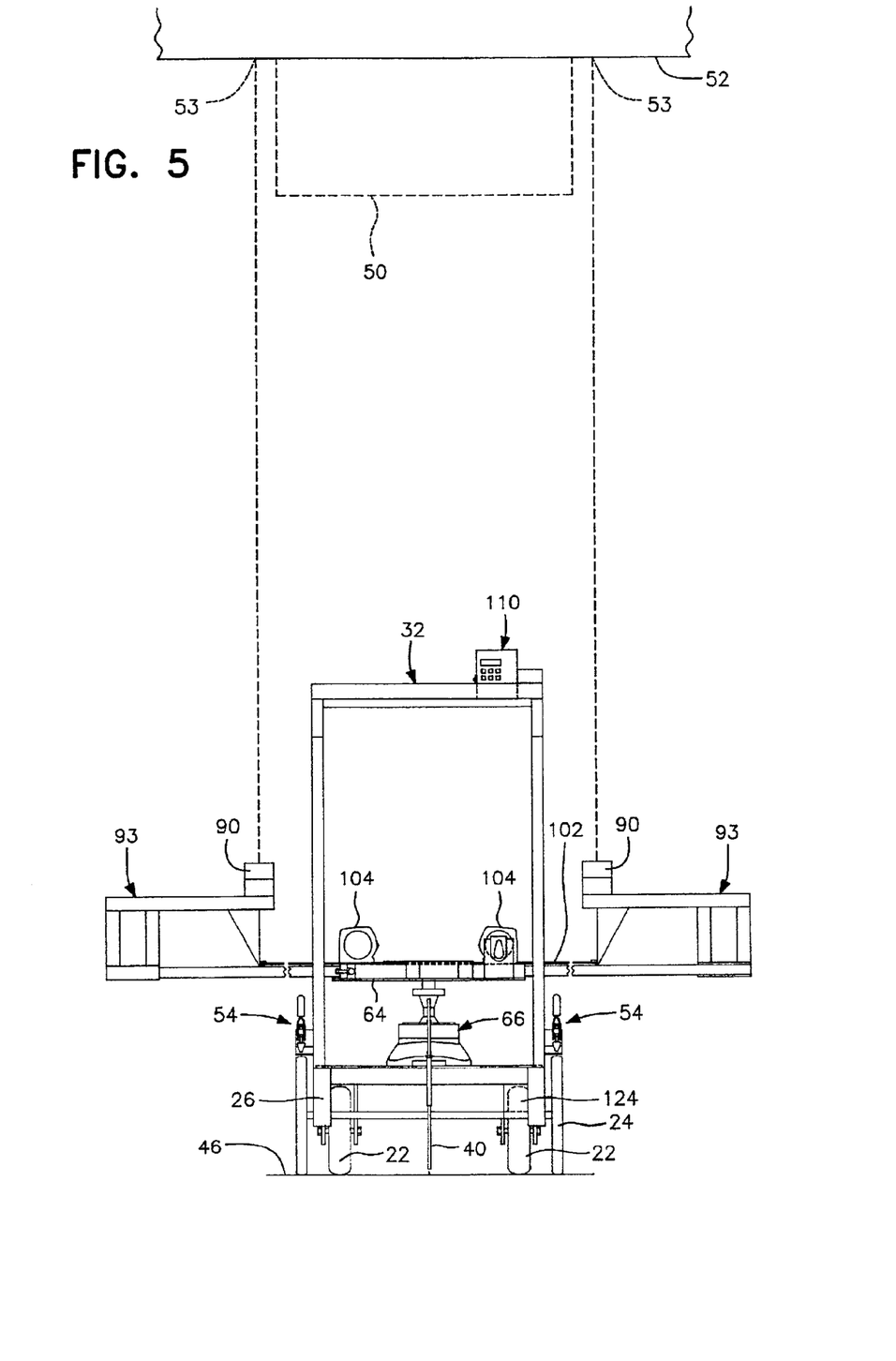
FIG. 5 is a rear elevational view of the mobile apparatus shown in FIG. 1 with duct bracket attachment points on an overhead ceiling being indicated.

Each of the front and rear frame members 18 and 20 includes a vertically supported pointer in the form of a vertical rod 40. The rods 40 are supported in a vertical sleeve 42 which is rigidly mounted at their transverse centers on the front and rear frame members 18 and 20. A retaining member 44 is preferably provided on each of the rods to adjustably support the rods 40 in a desired vertical position within the sleeves 42. In an operational mode, the rods 40 are suspended with the lower end thereof adjacent the floor surface 46. The floor surface 46 has a reference line 48 thereon which may be in the form of a chalk line to indicate the center line of a duct system 50 to be supported along an overhead ceiling 52 as illustrated in FIG. 5. In illustrating the mobile apparatus of the present invention, the apparatus will be described in terms of locating target points for the support brackets of a duct or ductwork for an HVAC system. However, it will be understood by those skilled in the art that the mobile apparatus of this invention can just as well be employed to identify and pinpoint target points for any overhead ceiling supported system, such as cable trays, water piping and other overhead ceiling suspended systems.

The reference line 48 in the form of a chalk line or series of markings on the floor surface 46 serves to indicate the center line of the duct 50 and is applied to the floor in the conventional manner. The pointers 40-are longitudinally spaced on the frame 14, and the apparatus,10 is manipulated by the operator with handle bar 38 so that the rods 40 track the reference line 48. This tracking assures that the center line of the supporting frame 14 and overall vehicle 10 are maintained in alignment with the reference center line 48 as the vehicle 10 is moved longitudinally along the reference line 48.

Each of the rear wheels 24 preferably includes a locking brake, generally designated by reference numeral 54, which is mounted externally on each vertical member 34 of the handle 32. The locking brake 54 includes a pivot handle 56 having a wheel engaging member 58 supported by an offset bracket 60. By pivoting the handle 56, the wheel engaging member 58 can be moved into locking engagement with the wheel 24, and the handle 56 can be locked in position by friction or a friction latch structure in a manner well known in the art. In an alternate embodiment, the locking mechanisms 54 can be in the form of a conventional horizontal handle bar brake, parallel to handle 38, and connected to braking elements for one or both of the rear wheels 24, as well known in the art for luggage pushcarts and the like.

The central portion of the frame 14 includes a support plate 62 extending transversely between the side members 16 and supported front and back by the intermediate transverse members 63. Supported above the plate 62 is a top member in the form of a rigid plate 64. A leveling support structure, generally designated by reference numeral 66, supports the top member 64 above the support plate 62 and enables the top member 64 to be leveled. The support structure 66 is conventional and includes a ball and socket arrangement which can be adjusted universally in order to level and lock the top member 64 in a leveled condition, irrespective of non-horizontal variations in the floor surface 46. A bubble level 68 located centrally on the upper surface of the top member 64 is used to level top member 64. The level 68 may be in the form of a square or rectangular plate as illustrated in FIG. 2.

Mounted on the rearward and forward edges of the plate 64, are a pair of stationary laser brackets 70 and 72, respectively, with each bracket 70 and 72 including spaced upstanding members forming a laser cradle in which a self-leveling laser 74 is supported (shown in FIG. 3, but not shown in FIGS. 1, 2, 4 and 5). The top member 64 is provided with an aperture 76 in each cradle bracket 70 and 72, such that the aperture 76 is in alignment with the pointers 40, for passage of a laser beam downwardly from the lasers 74 positioned in the laser brackets or cradles 70 and 72 as illustrated in FIG. 2. The laser brackets or cradles 70 and 72 are rigidly affixed to the upper surface of the top member 64, as by welding or the like. Hence, the lasers 74 emit a laser beam which provides single point transfer of layout points from the reference line 48 or other specific reference points on the floor surface 46 to the overhead surface.

The top member 64 includes a pair of parallel, spaced, transversely extending guide sleeves 78 and 80 rigidly attached to the upper surface of the top member 64. The sleeves 78 and 80 extend substantially throughout the width of the top member 64 on opposite sides of the center of the top member 64 as illustrated in FIG. 2 and are preferably rectangular or square hollow tubes. The guide sleeves 78 and 80 slidably receive transversely disposed support arms 82 and 84 therein. The arms 82 and 84 are similar in shape to the guide sleeves 78 and 80 and are supported by the guide sleeves when the support arms extend substantially beyond the ends of the guide sleeves 78 and 80. Supported at one end of the support arm 82 is a laser cradle 86 and supported at an opposite end of the support arm 84 is a laser cradle 88, each of which can support a self-leveling laser 90 (shown in FIGS. 1, 4 and 5, but not shown in FIG. 2). As illustrated in FIG. 2, each of the laser cradles 86 and 88 includes an aperture 92 by which a laser beam emitted from the laser 90 may extend downwardly to the floor surface 46.

Figure 4:
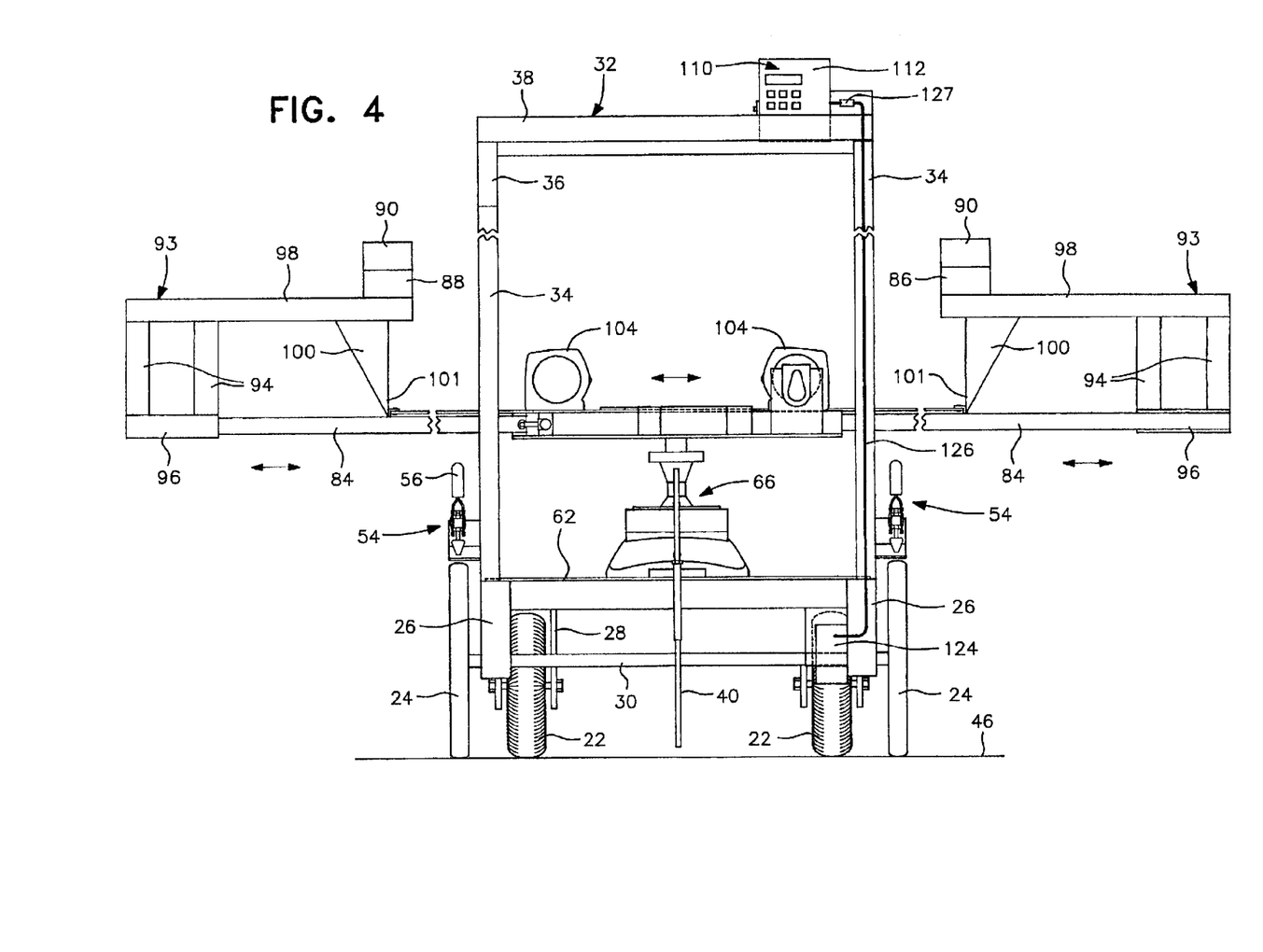
FIG. 4 is a rear elevational view of the mobile apparatus shown in FIG. 1.

The cradles 86 and 88 are mounted in an elevated position at the end of each of the support arms 82 and 84 by cradle support structure generally designated by reference numeral 93. The cradle support structure 93 includes a pair of parallel upstanding end members 94 affixed in spaced relation on sleeve 96 rigidly mounted on the end of the arms 82 and 84. The end members 94 support a top member 98 parallel with the respective support arm 82 and 84 and the respective laser cradle is mounted on top of the top member 98. As such, the support arm 82 on which the laser cradle 86 is mounted has the support structure 93 including a horizontal top member 98 in overlying spaced relation to the support arm 82, as illustrated in FIG. 4. Similarly, the laser cradle 88 is also mounted on horizontal member 98 in overlying spaced relation to the support arm 84, also as illustrated in FIG. 4.

At the inner end of each top member 98, a triangular depending member 100 is rigidly supported. The triangular member 100 has an apex lower end 101 adjacent the upper surface of each arm 82 and 84. The lower end 101 of each depending member 100 is connected to an end of a flexible measuring tape 102 that extends along the upper surface of each of the respective support arms 82 and 84.and sleeves 78 and 80 into a tape measure housing 104. The tape measure housings 104 are mounted on the end of the sleeves 78 and 80 remote from the respective depending member 100. The tapes 102 provides an indicator of the lateral positions of the support cradles 86 and 88 when associated with an index line 106 on a bracket 108 on each of the sleeves 78 and 80. The index lines 106 are aligned with the pointers 40. The indicia on each measuring tape 102 registers with the index line 106 to indicate a position of the respective laser 90 for emitting a beam onto ceiling 52 at a point 53 for a bracket to be located to support the duct 50, as shown in FIG. 5. Hence, the lasers 90 at the end of each of support arms 82 and 84 provide for the transfer of dual points in an overhead layout marked as a reference line or markings on the floor surface. Each sleeve 78 and 80 includes a brake device 79 supported by a bracket 81 attached to a sleeve to lock the arms 82 and 84 in adjusted position in sleeves 78 and 80 in the same manner that lock 54 locks rear wheels 24.

As an alternative to utilizing laser support arms 82 and 84 sliding in guide sleeves 78 and 80 mounted on the top member 64, telescopic tube assemblies may be utilized as the support arms. Each telescopic tube assembly would include a larger tube at one end of the assembly of each support arm rigidly affixed to the top member 64 and the smaller telescopic tubes in each tube assembly would telescope outwardly and inwardly to adjustably support the cradle support structures 93, laser cradles 86 and 88 and the lasers 90 in the same manner as described above and illustrated in FIGS. 2 and 4. The flexible measuring tapes 102 and the tape measure housings 104 would be utilized in the same manner as with the support arms 82 and 84. Specifically, the housing 104 of each tape measure would be mounted on the largest tube of each telescopic tube assembly and the free end of the measuring tape 102 would be connected to the lower end 101 of the depending member 100 in the same manner as illustrated in FIG. 4.

A resettable linear measuring device, generally designated by reference numeral 110, is mounted at the upper end of one of the upstanding vertical members 34 of the handle structure 32. The linear measuring device 110 includes a signal reader 112 slidably and removably mounted on handle 38, or on the vertical member 34 and extending inwardly therefrom, by any suitable means such as a bracket or velcro fastening. The removable mounting allows the linear measuring device 110 to be removed when the apparatus 10 is not in use.

To actuate the linear measuring device 110, an optical encoder 124 is mounted on rear axle 30. A flexible wire 126 connected to the encoder 124 extends upwardly through or alongside the vertically extending member 34 to the signal reader 112 through a separable conductive connection 127. The connection 127 enables electrical connection between the conductive wire 126 and signal reader 112. The optical encoder 124 provides an electronic input signal as to the distance traversed by the wheel 24 to tell the operator the linear distance traveled. Thus, the encoder 124 and reader 112 are appropriately used by the operator to measure the distance traveled by the apparatus 110 along reference line 48 to properly spaced target points on the overhead ceiling for placement of the support brackets or hangers to be installed. The encoder provides the electronic input signal into readout of the reader 112. The digital linear counter may be selectively converted between U.S. and metric measurement units.

In accordance with the present invention, the linear measuring device 110 can be removed from handle 38 or vertical member 34 after separating connector 127. This permits the linear measuring device to be removed along with all of the lasers when the apparatus is not in use. Removal of these sensitive instruments prevents their damage when the apparatus is not in use and enables the costly lasers and digital encoder to be stored in a secure storage area to prevent theft. Also, the use of a flexible wire enables the handle structure to be constructed so that it can be folded to a compact position for easier storage and transport of the apparatus 10.

Depending upon the length of the support arms 82 and 84 or the telescopic tubular support arms if used, hinge structures may be incorporated into the support arms to enable them to pivot to a collapsed position aligned with or inwardly of the wheels. This collapsing structure will insure that the apparatus 10 can be moved through a doorway having an entrance width at least sufficient to accommodate the wheeled structure. This collapsing structure also enables storage and transport in a more compact condition to facilitate its movement to different areas of use as well as to enable it to be stored and transported in a compact condition.

Figure 6:
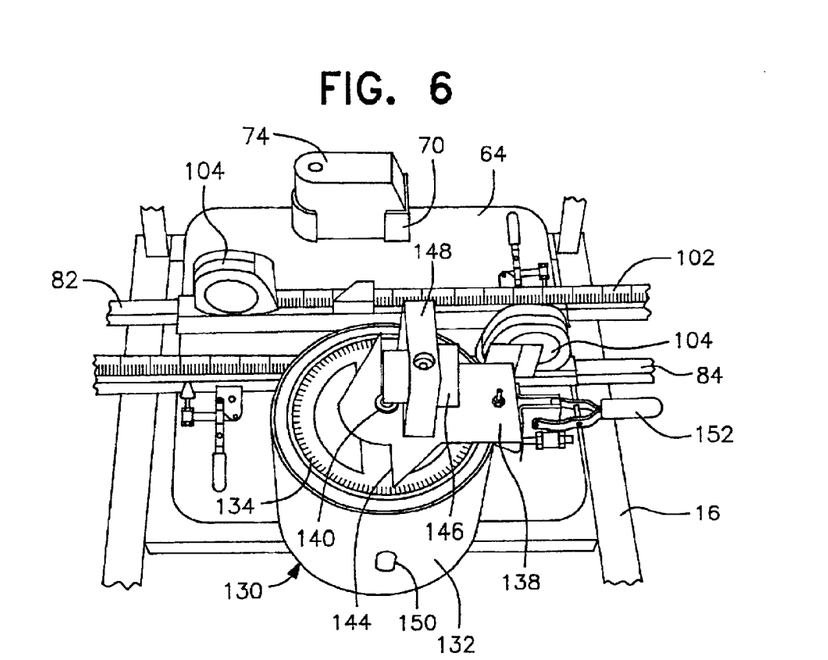
FIG. 6 is a perspective view of an attachment for the apparatus of the present invention, as shown in FIG. 1, which attachment includes a cylindrical drum to support a fifth laser on the front edge of the apparatus top member which can rotate through a 360° circumference.
Figure 7:
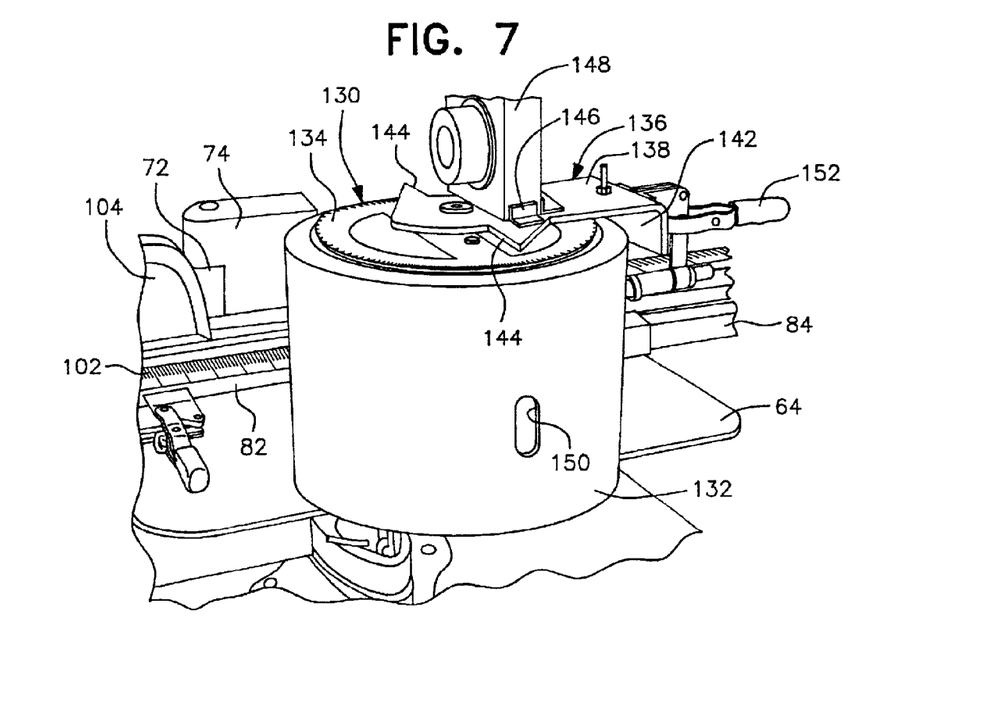
FIG. 7 is a side elevational view of the drum attachment shown in FIG. 6.
Figure 8:
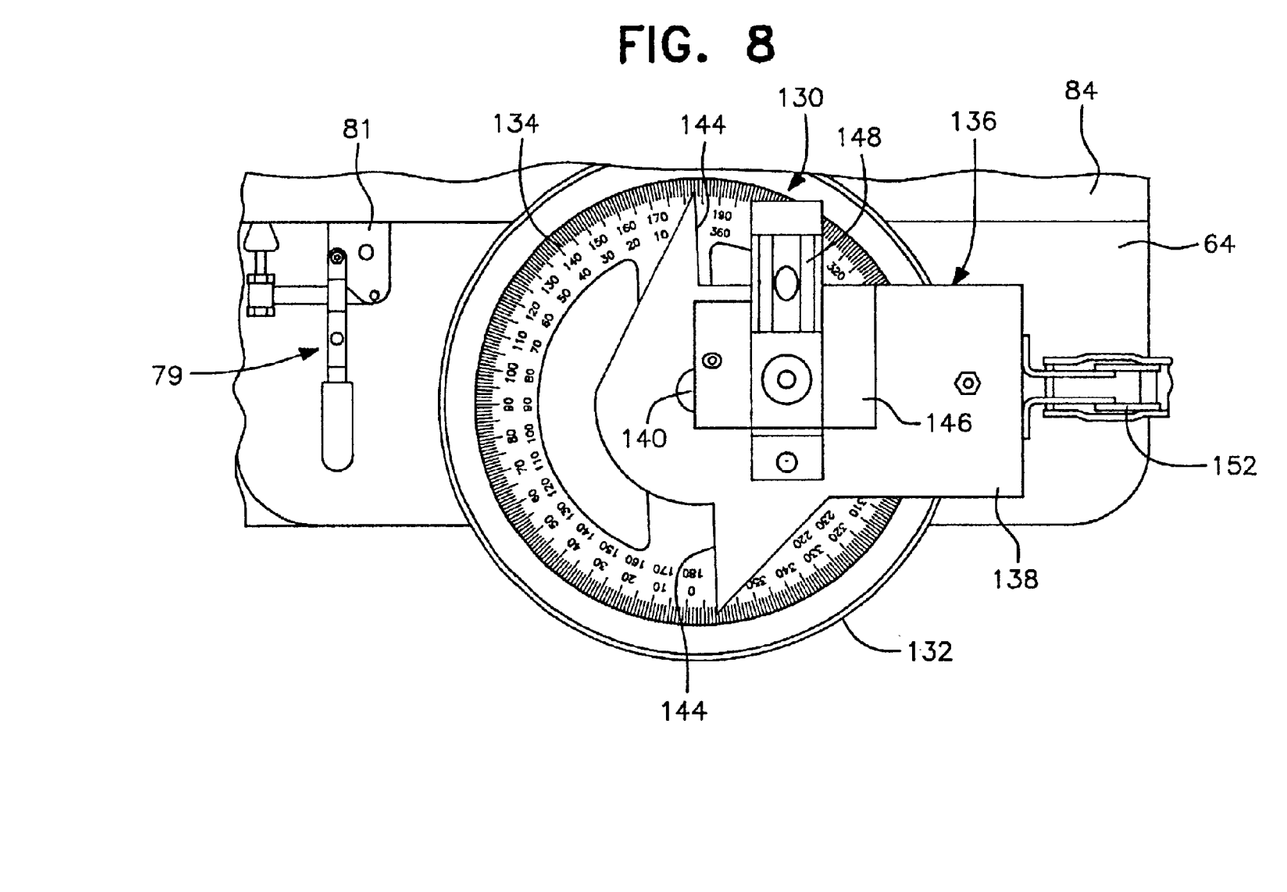
FIG. 8 is a top plan view of the drum attachment shown in FIG. 6.

Turning to FIGS. 6–8, there is illustrated a drum attachment, generally designated by reference numeral 130, which can be removably mounted in the laser bracket 72 on the top member 64 at the center of the forward edge portion thereof. The drum attachment 130 includes a drum 132 of cylindrical configuration having a 360° protractor 134 mounted on its top surface. An L-shaped pivot arm, generally designated by reference numeral 136, includes a horizontal leg 138 which extends partially across the top of the drum 132 and is pivotally connected to drum 132 by a hollow pivot 140. The pivot arm 136 also includes a depending shorter leg 142 which depends alongside the periphery of the drum 132. The horizontal leg 138 of the pivot arm 136, which extends across the drum, includes diametrically opposed pointers 144. The pointers 144 which register with the indicia on the protractor 134 to indicate the rotational movement of the pivot arm 136 about the pivot axis defined by vertically oriented hollow pivot 140. The leg 138 of the pivot arm 136 also includes a mounting bracket or cradle 146 for a laser 148. The drum 132 also includes a pair of diametrically aligned slot-like openings 150 in the peripheral wall thereof to enable a horizontal laser beam from a laser supported in bracket 70 on the center rear edge of the top member 64 to shine diametrically through the drum 132 onto a wall surface or the like.

The drum attachment 130 can be easily attached to the apparatus 110 at positions on the top member 64 by fitting it into bracket 72 on the top member 64. The pivot arm 136 can rotate 360° on a horizontal plane by the hollow pivot 140. The laser 148 can rotate about a full 360° in a vertical plane. The short leg 142 of the pivot arm 136 includes a lock device or brake 152 to lock the pivot arm 136 in relation to the drum. By moving the pivot arm rotatably about pivot 140 arcuate or curved reference lines may be indicated on wall surfaces or other surfaces. The movement of the pointers 144 in register with the 360° protractor 134 indicates the vertical plane of the laser on a radius extending from the pivot 140.

The drum attachment 130 is useful in locating target points along an overhead ceiling for support brackets and the like when the ductwork or other system to be hung is to make a turn, other than 90°, or the 90° turn is curved rather than a right angle. The attachment 130 allows the operator: to set the apparatus 10 at the prescribed angle for the lasers 90 to target the correct points for attaching a support bracket at a desired point around the curve or turn.

Figure 9:
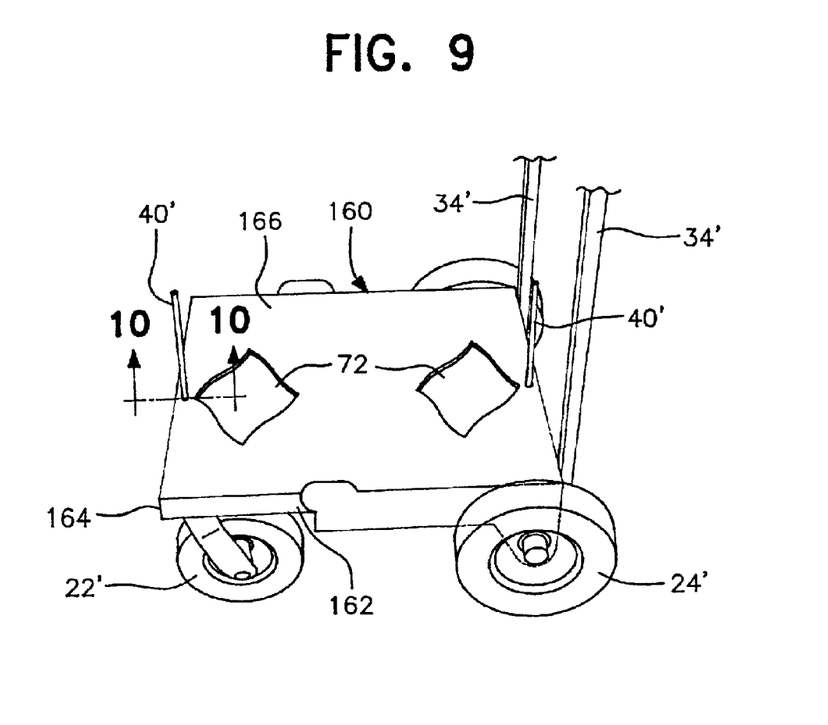
FIG. 9 is a perspective view of an alternative base structure for the mobile apparatus in accordance with the present invention.
Figure 10:
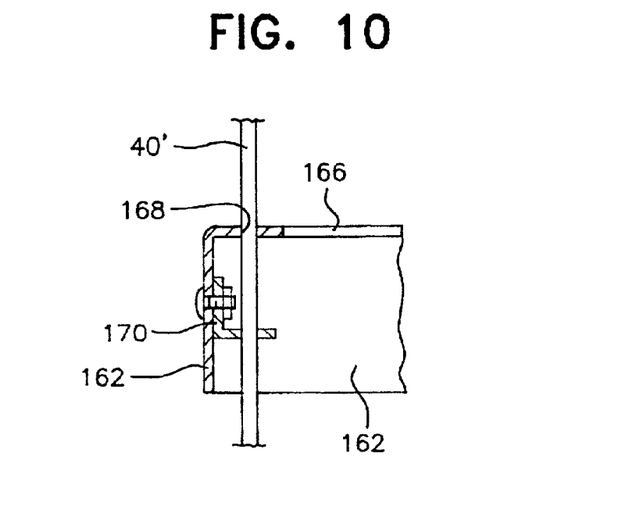
FIG. 10 is a partial cross-sectional side view of the structure shown in FIG. 9 taken along line 10—10.

Turning now to FIGS. 9 and 10, an alternate base structure, generally designated by reference numeral 160 is disclosed. The base structure 160 is made of one-piece construction, with the side edges 162 folded downwardly, and the side edge ends 164 welded together to form a solid base structure with a generally flat top surface 166. The base structure 160 is preferably formed from aluminum sheet metal or other lightweight material having sufficient strength to provide a rigid support structure for the apparatus 10. The pointers 40', front and aft of the base structure 160, are similar in construction and purpose to the pointers 40 of the embodiment illustrated in FIGS. 1–5. However, rather than being mounted in sleeves 42, the pointers 40' in the FIGS. 9–10 embodiment are supported in a hole 168 in the top surface 166 and a suitable bracket 170 rigidly supported on the base structure 160 by any suitable means. The spacial relation between the hole 168 and bracket 170 maintains the pointers 40' in appropriate vertical alignment.

Front wheels 22', rear wheels 24' and upstanding vertical members 34' are suitably mounted on the base structure 160 in the same manner as previously described in connection with the embodiment illustrated in FIGS. 1–5. The remainder of the apparatus 10 is the same as previously described, with simply the substitution of an alternate base structure 160 for base 12. The top surface 166 of the support structure 160 has appropriate holes cut or formed therein in order allow the downwardly directed vertical beams of front and rear lasers 74 to pass through the base structure 160. The pointers 40' have suitable retaining members (not shown) similar to retaining members 44 in the FIGS. 1–5 embodiment, to properly position the pointers 40' vertically within the holes 168 and brackets 170.

The lasers useful in the present invention are conventional self-leveling lasers, which emit beams in five directions, three in the horizontal plane and two in the vertical plane. Such lasers are commercially available under the tradename ROBOVECTOR.

In accordance with the method of the present invention, the mobile apparatus 10 tracks the reference line or markings 48 on the floor surface 46 using front and aft pointers 40 or 40'. At appropriate intervals determined by the linear measuring device 110, the lasers 74 and/or lasers 90 are activated to project one or more vertical laser beams upwardly onto the overhead ceiling surface 52 to identify attaching points 53 for support brackets to support HVAC ductwork 50 such as shown in FIG. 5. In addition, the drum attachment 130 allows the pivot arm 136 and laser 148 to rotate 360° on a horizontal plane around pivot 140 so that arcuate or curved reference lines can be indicated on wall surfaces or other surfaces in identifying target points on the overhead ceiling.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed is:

1. An apparatus for locating a point on one surface and indicating a corresponding point on another surface comprising a mobile wheeled base having an indicator thereon to position the base in predetermined relation to a point on one surface and a light beam emitting device mounted on said base in predetermined relation to said indicator to emit a light beam to impinge on said another surface to indicate a point on said another surface corresponding to the point on said one surface, said indicator including a pair of longitudinally spaced and aligned pointers mounted on and depending from said base for alignment with a reference line on said one surface, said pointers being vertically adjustably mounted on said base to enable a lower end of each pointer to be positioned in alignment with and adjacent to said reference line on said one surface, said light beam emitting device including a pair of support arms oriented perpendicular to a longitudinal line extending between said pointers, each of said support arms being laterally adjustably supported on said base and supporting a laser beam emitting device on an outer end thereof to enable said laser beam emitting devices to adjustably indicate points on said another surface.

2. The apparatus as defined in claim 1, wherein said base includes a frame supported by a pair of rear wheels rotatably supported on said frame by a transverse axle mounted on said frame and a pair of caster front wheels mounted on said base to enable movement of said base along said one surface.

3. The apparatus as defined in claim 2, wherein said base includes a linear measuring device connected with said rear wheels to indicate linear movement of said base along said one surface.

4. The apparatus as defined in claim 3, wherein said linear measuring device is a resettable electronic device convertible between U.S. and metric measurement units.

5. The apparatus as defined in claim 1, wherein said base includes an upwardly extending handle to enable manual movement of said base to a desired location while supported on said one surface to position said pointers in alignment with said reference line on said one surface.

6. The apparatus as defined in claim 1, wherein said base includes a support mounted thereon by a leveling structure and at least one bracket on said support to support a laser beam emitting device on said support.

7. The apparatus as defined in claim 1, wherein said base includes a leveled top member, a pair of laser beam emitting device cradles mounted on said top member for supporting a pair of laser beam emitting devices from said base for indicating multiple points on said another surface.

8. The apparatus as defined in claim 1, wherein said base includes a leveled top member, a drum mounted on said top member, said drum facing upwardly and including a 360° protractor on its upper surface, a pivot arm mounted on said drum and including a pointer associated with said protractor to indicate movement of the pivot arm in a horizontal plane about a vertical axis, and a laser beam emitting device mounted on said pivot arm.

9. A mobile apparatus for identifying target points for attaching support brackets on an overhead surface to support an overhead conduit system based upon a reference marking on a floor surface configured in accordance with said conduit system, said mobile apparatus comprising a mobile support structure having an indicator thereon to position said support structure with respect to said reference marking on said floor surface and a pair of laser beam emitting devices mounted on laterally adjustably support arms on said support structure, said laser beam emitting devices identifying adjacent target points on said overhead surface for attaching a support bracket.

10. The apparatus as defined in claim 9, wherein said mobile support structure includes a wheeled base having an upwardly extending handle at a rearward edge portion thereof terminating at an elevation enabling a user to comfortably grasp the upper end of the handle while in an upright position to move the base to a desired location, said indicator including a pair of longitudinally spaced and aligned pointers depending from said cart and being vertically adjustably mounted on said base to enable the lower end of each pointer to be positioned in alignment with and adjacent to said reference line on said one surface, said support arms being oriented perpendicular to a longitudinal line extending between said pointers for orienting the laser beam emitting devices to indicate points on a ceiling surface at equal distances from an overhead conduit system to be supported from an overhead surface.

11. The apparatus as defined in claim 10, wherein said wheeled base includes a pair of supporting wheels having a known circumference and a linear movement measuring device operatively associated with said wheels for indicating the linear movement of the base to enable points to be indicated on the overhead surface at predetermined intervals, said wheels including brakes to lock the wheels and maintain the base in stationary position when indicating the points on said overhead surface, each of said support arms including a cradle for a laser beam emitting device, a handle structure on one end of each support arm adjacent the cradle to laterally adjust the support arms, each support arm being slidably supported by a transverse sleeve mounted on said base in perpendicular relation to a longitudinal line extending between said pointers, a flexible tape measure mounted in a linear manner along each support arm, each tape measure being associated with an index line on each sleeve to indicate the laterally adjusted position of the laser beam emitting cradles in relation to a longitudinal line extending between said pointers to enable the laser beam emitting devices to indicate points on an overhead surface in relation to conduit systems having different width characteristics.

12. An apparatus for locating a point on one surface and indicating a corresponding point on another surface comprising a mobile wheeled base having an indicator thereon to position the base in predetermined relation to a point on one surface and a light beam emitting device mounted on said base in predetermined relation to said indicator to emit a light beam to impinge on said another surface to indicate a point on said another surface corresponding to the point on said one surface, said indicator including a pair of longitudinally spaced and aligned pointers mounted on and depending from said base for alignment with a reference line on said one surface, said pointers being vertically adjustably mounted on said base to enable a lower end of each pointer to be positioned in alignment with and adjacent to said reference line on said one surface, said light beam emitting device including a pair of support arms oriented perpendicular to a longitudinal line extending between said pointers, each of said support arms being laterally adjustably supported on said base and supporting a laser beam emitting device on an outer end thereof to enable said laser beam emitting devices to adjustably indicate points on said another surface, each of said support arms including a flexible, rewindable tape measure associated therewith to indicate the scope of lateral movement of the laser beam devices mounted on said support arms.

* * * * *